Figure 1:
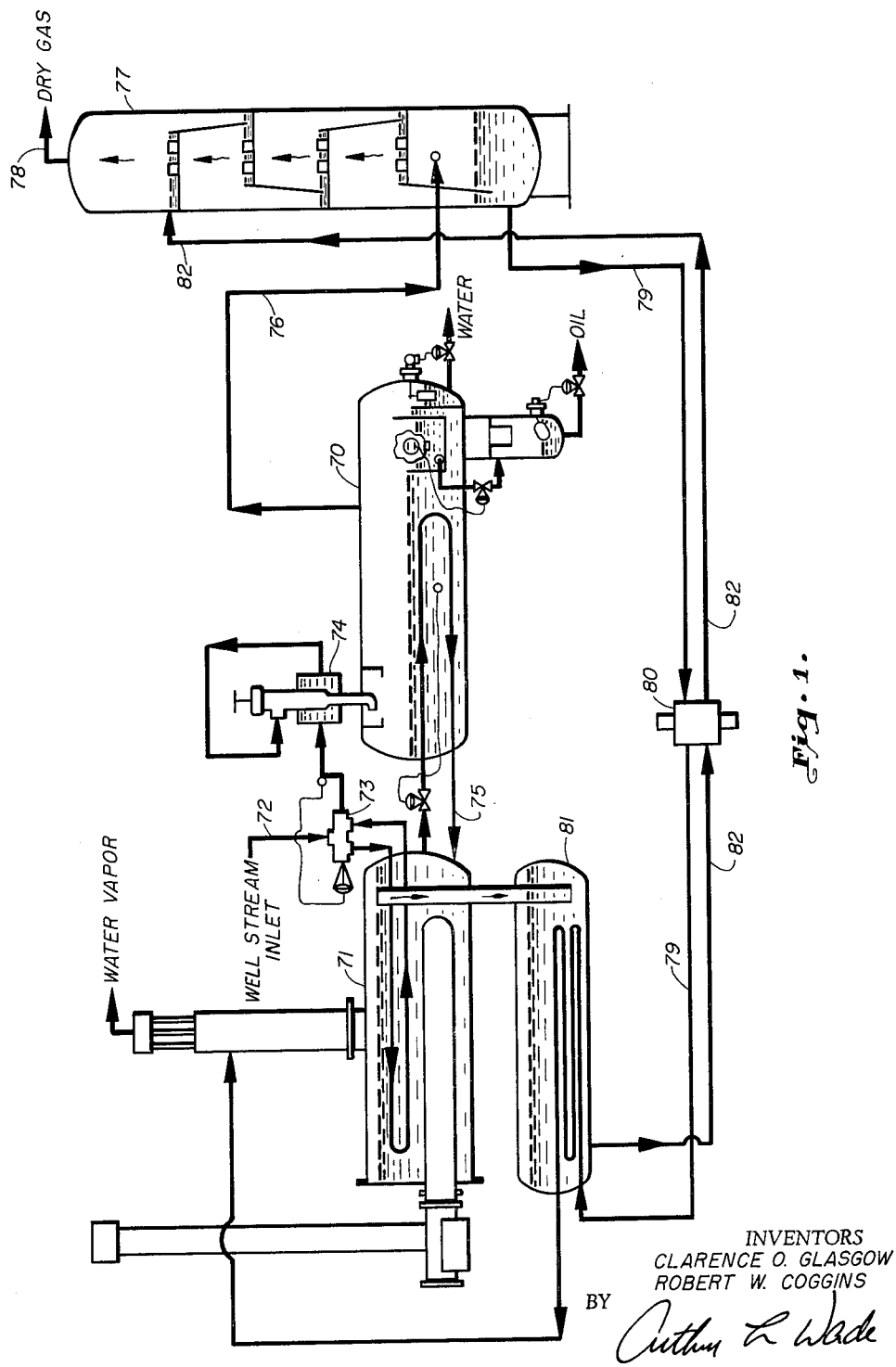

Sept. 21, 1965   C. O. GLASGOW ETAL   3,206,916
METHOD AND APPARATUS FOR PRODUCING OIL AND GAS WELLS
Original Filed May 13, 1960   2 Sheets-Sheet 1

INVENTORS
CLARENCE O. GLASGOW
ROBERT W. COGGINS
BY
Arthur L. Wade
ATTORNEY

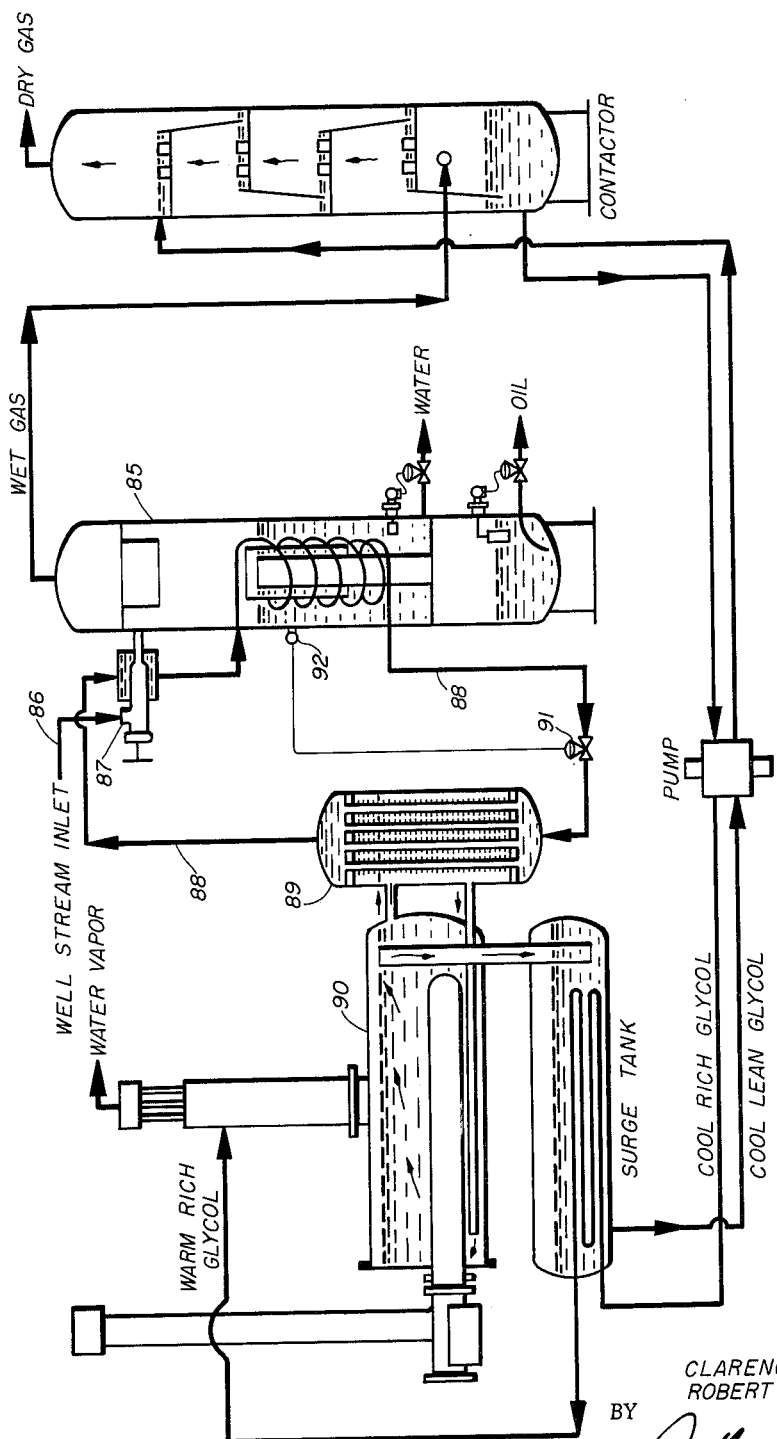

United States Patent Office 3,206,916
Patented Sept. 21, 1965

3,206,916
METHOD AND APPARATUS FOR PRODUCING OIL AND GAS WELLS
Clarence O. Glasgow and Robert W. Coggins, Tulsa, Okla., assignors to National Tank Company, Tulsa, Okla., a corporation of Nevada
Original application May 13, 1960, Ser. No. 28,988, now Patent No. 3,119,674, dated Jan. 28, 1964. Divided and this application Nov. 13, 1963, Ser. No. 323,331
6 Claims. (Cl. 55—20)

This application is a division of application S.N. 28,988, filed May 13, 1960, now Patent 3,119,674 issued January 28, 1964.

The present invention relates to a method and apparatus for heating the production of predominantly gaseous hydrocarbon wells in field processing the production as it is taken to pipe lines of purchasers. More specifically, the invention relates to a method and structure for applying the heat of a separate heat exchange fluid at substantially atmospheric pressure to the fluids of a predominantly gaseous hydrocarbon well stream to further the separation of the fluids.

The prior art teaches that low temperature separation of distillate and water from relatively high pressure well streams, the well stream may be heated by a gas-fired heater and passed through a separate high-pressure knockout vessel before having its pressure reduced in the so-called low temperature separation process in which a liquid bath within the vessel is arranged to catch and melt the hydrates formed. The liquid bath in which the hydrates are melted is heated by either the hot well stream before its pressure is reduced or a separate source of heat.

The prior art teaches that steam has been used in coils immersed in the liquid bath to bring the bath temperature up to its desired level for melting hydrates. The entire low temperature separator has also been enclosed within the shell of an indirect heater to apply heat at the required locations within the separator.

However, today there are also an ever increasing number of wells which do not warrant the use of the low temperature separation process. Also, the low temperature separation arrangements are expensive and difficult to operate. Also, the payout in liquid recovery has often been difficult to obtain, and may be impossible to obtain as the native pressure of the well declines. These wells may produce only 3 to 10 barrels of storage tank hydrocarbon liquid per million cubic feet of gas. Nevertheless, this well production must be separated into gas, liquid, free water, foreign matter, and distillate before the gas is delivered to a purchasing pipeline. A separator is used, and there is the problem of economically heating the liquids in the separator, and the gas produced into the separator. Also, freezing of the water that is separated from the liquids must be circumvented and the gas must be kept above the hydrate point as its pressure is reduced to pipeline pressure under the operating conditions of the separation. The present invention solves these heating problems with an inexpensive, dependable, maintenance-free, rugged, heating system for a regular production separator which requires a minimum of attention from an operator.

A principal object of the invention is to provide a heating system operating at substantially atmospheric pressure including thermosiphonic liquid flow through a separator vessel into which a well stream is produced.

Another object is to automatically control the circulation of an independent heat exchange liquid flowed thermosiphonically through a separator in which a well stream is processed.

Another object is to apply the heat of an automatically circulated heat exchange liquid through a field separator to selected portions of separated fluids.

The present invention contemplates a combination of a separator for well fluids and a heater independently operated at substantially atmospheric pressure to thermosiphonically circulate heat exchange liquid through a conduit system extended through the separator vessel.

The invention further contemplates a heat exchanger incorporated within the heater, which heater is operated at substantially atmospheric pressure in preheating the entire well stream flowing through the heat exchanger and produced into the separator vessel, the amount to prevent subsequent hydrate accumulation in the gaseous portion of the well stream.

The invention further contemplates a conduit system bringing the heat exchange liquid to the separator and the conduit system including a jacket mounted on the operator wall in its circuit, the jacket being placed in relation to the water separated from the well stream liquids within the vessel so as to flow heat from the heat exchange liquid into the water.

The invention further contemplates a valve being placed in the conduit system and operated to control the thermosiphonic circulation of the heat exchange liquid through the conduit system to heat only the separated liquids the amount to prevent freezing of the water in the separated liquids.

The invention further contemplates a barrier structure within the conduit system to prevent continued thermosiphonic circulation of the heat exchange liquid within that portion of the conduit system in the separator vessel while the control valve in the conduit system is closed.

Other objects, advantages and features of this invention will become apparent to one skilled in the art upon consideration of the written specification, appended claims, and attached drawings, wherein:

FIG. 1 is a somewhat diagrammatic, sectioned, side elevation of a separator and glycol dehydration system embodying the present invention; and FIG. 2 is similar to FIG. 1 with the heated glycol applied to heat exchanging with a liquid which is directly applied to heating the liquids of a field separator.

*Glycol as heat exchange liquid*

Under the concept of the present invention, water is only one of various satisfactory liquids which can be thermosiphonically circulated to maintain the temperatures associated with a separator vessel within desirable ranges. The reconcentrated glycol from a system for dehydrating gas may be also employed. In FIG. 1, there is illustrated a possible arrangement for bringing heated glycol into heat exchange with a separator liquid bath.

The specific arrangement of the components may be a choice of design. In FIG. 1 separator vessel 70 is diagrammatically illustrated in substantially the same horizontal plane as glycol reconcentrator 71. The well stream is brought to the system through conduit 72 and a portion of it split into a heat exchange coil in reconcentrator 71 by valve 73. Valve 73 is indicated as generally controlled by the temperature of the well stream downstream of valve 73 and upstream of choke jacket 74.

The well stream of conduit 72 may be introduced into separator 70. However introduced, the well stream has its temperature controlled by the heat of the glycol in reconcentrator 71.

To utilize the heating potential of the reconcentrated glycol in reconcentrator 71, a conduit 75 is illustrated as extending from reconcentrator 71 into the horizontal liquid bath in the base of separator 70. Conduit 75 takes the hot glycol from the upper portion of reconcentrator 71 at an elevated temperature, delivers its heat to liquid bath within separator 70, and returns the glycol to the bottom portion of reconcentrator 71 at a reduced temperature. The result is thermosiphonic flow of the glycol through conduit 75 to maintain a desired temperature within the liquid bath within separator 70. The temperature of the liquids within separator 70 are indicated as controlling a valve in conduit 75 to exercise control over the amount of glycol allowed to circulate in conduit 75.

The gas from separator 70 is drawn off by conduit 76 to the bottom of contactor tower 77. Within contactor tower 77, the gas from conduit 76 is flowed upward while reconcentrated glycol is flowed downward, over a series of contact trays. The dehydrated gas is then removed from tower 77 through conduit 78.

The wet glycol is removed from the bottom of tower 77 by conduit 79 and returned to reconcentrator 71 with pump 80. The reconcentrated glycol of surge tank 81 is also pumped by pump 80 to the top of contactor tower 77 through conduit 82. Thus, quite diagrammatically, is illustrated the essential components of a liquid desiccant system employing liquid glycol for dehydrating the gas removed from separator 70. In the process of regenerating this liquid glycol, it is passed through the liquid bath of separator 70 in heat exchange relationship, powered by thermosiphonic force. Additionally, the heat of the reconcentrated liquid glycol is utilized for bringing the well stream to a suitable temperature for passing through the choke heated by the jacket 74. The basic concept of utilizing the thermosiphonic flow of heated heat exchange liquid for developing and maintaining a field separator at a desired temperature is embodied in this disclosure.

*Indirect heating of a separator by glycol*

FIG. 2 is presented to demonstrate how heat may be indirectly transferred from reconcentrated glycol to a field separator. Essentially, it is contemplated that a heat exchanger be provided to utilize the hot liquid glycol to elevate the temperature of a separate, thermosiphonically circulated, heat exchange liquid to the separator.

The form of separator indicated at 85 has its longitudinal axis vertically extended. The internal structure of this vertical form of separator is basically that of the horizontal form of the preceding disclosure. A well stream is indicated as brought to the separator through conduit 86, passing through choke 87. The choke may be heated under any of the other forms previously ilustrated. The temperature of the separator liquid bath is maintained with heat exchange conduit 88. Conduit 88 is illustrated as connected to the tube side of a heat exchanger 89. Reconcentrated glycol from reconcentrator 90 is circulated through the shell side of the heat exchanger 89.

The essential elements of the inventive concept are found in this system illustrated in FIG. 2. The hot glycol of reconcentrator 90 is utilized to elevate the temeprature of a separate liquid heat exchange medium in conduit 88. The heat exchange liquid may be water, elevated to a temperature less than that at which vaporization occurs. Alternately, the water of conduit 88 may be vaporized to steam which will give up its heat of vaporization to the liquids of separator 85.

To control a liquid heat exchange medium in conduit 88, valve 91 is indicated as regulated from thermoresponsive element 92. Element 92 being responsive to the liquid bath of separator 85, heated by coil 88, the circulation of liquid in conduit 88 is regulated to maintain the temperature of the bath. Obviously the control of liquid in conduit 88 and glycol flow between reconcentrator 90 and heat exchanger 89 can be more elaborate than illustrated. If the liquid of conduit 88 is heated hot enough to vaporize, the control of its flow to separator 85 would be by one segment while the control of condensed liquid to exchanger 89 would be by a second segment of a control system. However, for the purpose of the present disclosure, the regulation of the flowing mediums is sufficiently illustrated to attain the objects of the present invention.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illlustrative and not in a limiting sense.

The present invention having been described, what is claimed is:

1. A method of producing a predominantly gaseous hydrocarbon well stream to pipe line pressure including,
   reducing the high pressure of the well stream to pipe line pressure,
   introducing the well stream pipe line pressure into a separator vessel providing the capacity in which separation of the stream into a gaseous portion and a liquid portion takes place,
   removing the liquid portion from the separator vessel,
   removing the gaseous portion from the separator vessel,
   passing the gaseous portion into contact with a liquid desiccant to absorb water from the gaseous portion,
   heating the liquid desiccant to remove the water absorbed by the gaseous portion,
   passing a portion of the heated liquid desiccant in indirect heat exchange with only the separated liquid portion in the lower portion of the separator vessel,
   controlling the heat exchange between the heated liquid desiccant and only the separated liquid portion to prevent freezing of the separated liquid portion,
   placing the heated liquid desiccant in indirect heat exchange with the well stream before the well stream is introduced into the separator vessel,
   and controlling the heat exchange between the well stream and the desiccant to prevent subsequent substantial hydrate formation in the gaseous portion of the well stream when the pressure of the well stream is reduced to pipe line pressure.

2. A system for producing a predominantly gaseous hydrocarbon high pressure well stream to pipe line pressure including,
   an inlet conduit containing the well stream,
   a choke in the inlet conduit through which the well stream is reduced to pipe line pressure,
   a vessel connected to the inlet conduit downstream of the choke to receive the well stream from the choke at pipe line pressure, the vessel providing the capacity in which separation of the gaseous portion of the well stream from the liquid portion takes place,
   separate conduits from the separator vessel to remove the gaseous portion and the liquid portion,
   a vapor-liquid contact vessel connected to the conduit for the gaseous portion to receive the gaseous portion and contact the gaseous portion with liquid desiccant to absorb water from the gaseous portion,
   a reconcentrator vessel connected to the contact vessel to receive the dilute desiccant,
   means for heating the liquid desiccant in the reconcentrator vessel to drive off the absorbed water so it may be recirculated to absorb additional water from the gaseous portion,
   a conduit system connecting the separator vessel and the reconcentrator vessel with which to bring heat to only the liquid portion of the well stream from the heated liquid desiccant to prevent freezing of the separated liquid portion,
   and means for transmitting the heat of liquid desiccant in the reconcentrator vessel into the well stream passing through the inlet conduit to prevent subsequent substantial hydrate formation in the gaseous portion of the well stream when the pressure of the well stream is reduced to pipe line pressure.

3. A system for producing a predominantly gaseous hydrocarbon high pressure well stream to pipe line pressure including, an inlet conduit containing the well stream, a choke in the inlet conduit through which the well stream is reduced to pipe line pressure, a vessel connected to the inlet conduit downstream of the choke to receive the well stream from the choke at pipe line pressure, the vessel providing the capacity in which separation of the gaseous portion of the well stream from the liquid portion takes place, separate conduits from the separator vessel to remove the gaseous portion and the liquid portion, a vapor-liquid contact vessel connected to the conduit for the gaseous portion to receive the gaseous portion and contact the gaseous portion with liquid desiccant to absorb water from the gaseous portion, a reconcentrator vessel connected to the contact vessel to receive the dilute desiccant, means for heating the liquid desiccant in the reconcentrator vessel to drive off the absorbed water so it may be recirculated to absorb additional water from the gaseous portion, a conduit connected between the reconcentrator and separator vessels to pass the heated desiccant in indirect heat exchange with only the separated liquid portion in the lower portion of the separator vessel, means arranged to sense the temperature of the separated liquid portion heated by the indirect heat exchange, control means for the conduit between the reconcentrator and separator vessels which is responsive to the means sensing the temperature of the separated liquid portion to regulate the desiccant and prevent freezing of the separated liquid portion within the separator vessel, means for placing the heated desiccant in indirect heat exchange with the well stream before the well stream is introduced into the separator vessel, means arranged to sense a temperature of the well stream heated by the desiccant in the indirect heat exchange, which temperature is representative of the temperature of the gaseous portion of the well stream in the separator vessel, and control means for the heat transferred by the indirect heat exchange which is responsive to the means sensing the temperature representative of the temperature of the gaseous portion to prevent substantial subsequent hydrates in the gaseous portion of the well stream when the pressure of the well stream is reduced to pipe line pressure.

4. A system for producing a hydrocarbon well stream which is predominantly gaseous, including;

a separator vessel in which the well stream is received and separated into gaseous and liquid phases;

a liquid desiccant system including;

a contactor vessel connected to the separator vessel to receive the gaseous phase and dehydrate the gaseous phase by contact with the desiccant, and a reconcentrator connected to the contactor vessel to receive the desiccant and thermally reconcentrate the desiccant and return the reconcentrated desiccant to the contactor vessel to dehydrate the gaseous phase;

and a closed conduit system connected only to the reconcentrator at two points of different elevation for receiving the reconcentrated desiccant and arranged in heat exchange relation with only the liquid phase in the separator vessel for thermosiphonic circulation of the reconcentrated desiccant between the reconcentrator and the conduit system to prevent freezing of the liquid phase in the separator vessel.

5. The system of claim 4, including, means arranged to sense a temperature condition within the separator vessel, and means arranged to control the thermosiphonic circulation of the reconcentrated desiccant by the means sensing the temperature condition within the separator vessel.

6. The system of claim 4, including, a conduit system connected between the well and the separator vessel to convey the well stream to the separator and arranged in heat exchange with the desiccant within the reconcentrator, and means arranged to sense the temperature of the well stream in the conduit system between the reconcentrator and the separator vessel and control the heat exchange between the conduit system and the desiccant to prevent subsequent substantial hydrate formation in the gaseous portion of the well stream in the separator.

References Cited by the Examiner

UNITED STATES PATENTS

| | | | |
|---|---|---|---|
| 2,990,691 | 7/61 | Glasgow | 55—174 X |
| 3,012,629 | 12/61 | Walker et al. | 55—57 |
| 3,132,987 | 5/64 | Sinex | 55—31 X |

REUBEN FRIEDMAN, *Primary Examiner.*